May 27, 1969 W. H. BIXBY 3,447,062

POLYPHASE BOOSTER CONTROLLED BATTERY CHARGER WITH REDUCED TELEPHONE INTERFERENCE

Filed July 5, 1966

Inventor:
William H. Bixby,
Brown Jackson Boettcher & Dienner
Attys

Inventor:
William H Bixby
By Brown Jackson Boettcher & Dienner
attys

Inventor
William H Bixby,
By Brown Jackson Boettcher + Dienner
attys

Inventor:
William H. Bixby,
By Brown Jackson Boettcher & Dienner
Attys

GRAPH OF OBSERVED LINE CURRENT
WAVEFORM OF SYSTEM OF FIGS 1+2

Inventor:
William H. Bixby,
By Brown, Jackson, Boettcher & Dienner
Attys

Inventor:
William H. Bixby,
By Brown, Jackson, Boettcher & Dienner
Attys

Inventor:
William H. Bixby,
By Brown Jackson Boettcher & Dienner
Attys

Inventor
William H Bixby,
By Brown Jackson Boettcher & Dienner
attys

United States Patent Office 3,447,062
Patented May 27, 1969

3,447,062

POLYPHASE BOOSTER CONTROLLED BATTERY CHARGER WITH REDUCED TELEPHONE INTERFERENCE

William H. Bixby, Columbus, Ohio, assignor, by mesne assignments, to New North Electric Company, Galion, Ohio, a corporation of Ohio Filed July 5, 1966, Ser. No. 562,723
Int. Cl. H02m *1/08, 7/44*
U.S. Cl. 321—5 14 Claims

ABSTRACT OF THE DISCLOSURE

A polyphase battery charger which provides minimum telephone interference having a delta connected main transformer with secondary windings connected in quadruple zigzag array, and a delta connected booster transformer with two primary windings in each arm being series-connected a pair of gated switches, and two secondary windings for each booster primary winding, the secondary winding for one booster primary winding being connected in series with and phase displaced with the vector provided by one zigzag, and the secondary winding for a different booster primary winding in the same booster arm being connected in series with and phase displaced with the consecutive vector phase provided by a different zigzag. Each main secondary winding is connected to the load by one uncontrolled rectifier and the associated booster winding is connected to the load in series with the main transformer by a second rectifier which blocks the first rectifier when conductive.

The present invention relates to polyphase battery chargers having controlled booster means, and more specifically to a polyphase battery charger of such type which is arranged so as to minimize the telephone interference resulting from harmonic components of current produced by the battery charger in the line wires which connect the alternating current source to the battery charger and supply power thereto.

Harmonic currents and voltages set up in the incoming power lines by the battery chargers result in magnetic and electric fields of harmonic frequencies about the power lines, which, in turn, may induce voltages of the same frequencies in paralleling telephone circuits, causing noise therein. "Induction caused by power circuit currents is called magnetic; that caused by power circuit voltages is called electric. Whether noise problems will occur and, if so, their severity and extent will depend on the magnitudes of the harmonic currents and voltages at various places over the power system, the characteristics of the power system, the amount, type and location of the situations of proximity between power and telephone circuits (that is, 'exposure'), and the characteristics of the telephone circuits . . . . The current taken by a rectifier unit from the AC line has a step-type wave shape resulting from the flat top wave shape of the anode currents . . . . The magnitudes of the harmonic currents have a definite relation to the magnitude of the total rectifier current and also depend on the order of the harmonic. The higher the order of a harmonic, the smaller is its magnitude . . . . If a communication circuit should have an exposure to the power line . . . , experience shows that the controlling inductive effect in such a case is almost always caused by the harmonic current rather than by the harmonic voltage; the latter can, therefore, be neglected without much error for an exposure to the main supply feeder." If the power line has an extension beyond the battery charger for feeding other loads, the harmonic voltage will also cause harmonic currents to flow in the wires extending to these loads so that induction from these extension lines into communication circuits exposed to them may occur. "In practice, however, the circuit over which the rectifier receives its power usually has the lowest impedance and draws the greater part of the harmonic currents." (The foregoing quotations are taken from "Inductive Co-ordination Aspects of Rectifier Installations"—AIE Transactions, July 1946, volume 65.)

One of the most common methods of reducing electrical noise in very large rectifiers is to design the rectifier system to operate with a maximum number of phases so as to eliminate most of the lower harmonics. However, in practice, because of unequal phase-shift which is built into the transformer, a certain percentage of undesirable lower harmonics remains present, and as a result produces noise.

Modern telephone instruments, however, have been improved to such an extent that they are currently relatively less susceptible to these lower harmonics than was the case ten years ago. This is reflected in the present use of the C message weights in measuring noise instead of the "144" and F1A weightings which were formerly used. Modern telephone receivers now pick up much higher frequencies, and therefore, the higher frequencies carry more weight in the C message weighting charts. Accordingly, it will be appreciated that it is desirable to provide a battery charger apparatus which operates with a higher number of phases on the secondary side to cause the harmonic frequencies, which are incidentally produced, to be of a correspondingly higher frequency, and thereby minimize the noise effect in the receivers of the telephone instruments.

In rectifier circuits in which the transformer connections are arranged so as to increase the number of phases on the secondary side, it is well known that if the rectifier circuit connected to the transformer secondary is supplying "*p*" voltage pulses per cycle to the load circuit per cycle of the source voltage under balanced conditions with a three phase source, only those harmonic components of current are present in the line wires which are of the order of $np\pm1$ (where $n=1, 2, 3, 4, 5$). . . . For example with a six pulse output, the harmonic components above the fundamental which would be present in the line currents would be the 5th, 7th, 11th, 13th, 17th, 19th, etc. If the transformers were so connected as to give a twelve pulse output the harmonic components present would be the 11th, 13th, 23rd, 25th, 35th, 37th, etc.

As the number of pulses, or phases, in the output from the rectifier-transformer combination is increased, the transformer becomes more complex and the number of rectifying diodes which must be provided increases. The advantages to be gained from the reduction in harmonic components which are bothersome in the input currents must then be weighed against the increased cost of construction of the rectifying unit.

When the rectifier circuit is of the controlled type employing silicon controlled rectifiers or other switching devices to control the timing of the output pulses, the economic penalty associated with increasing the number of output pulses becomes greatly aggravated due to the relatively high cost of such switching devices plus the increased complexity in the circuitry for controlling the timing of the switching of these devices.

It is an object of this invention to provide a battery charger incorporating a booster arrangement having primary control, similar to that covered in the copending application, Ser. No. 311,053, assigned to the assignee of the present invention, into a twelve pulse rectifier circuit to achieve a further substantial reduction in the higher harmonic content of the line currents over that achieved in Ser. No. 311,053 without increasing either the number of switching devices, or the complexity of the circuitry for timing the switching action over that used for a six pulse rectifier.

It is another object to provide a battery charger having such a booster arrangement in a three phase rectifier circuit comprising a main transformer having secondary winding means providing twelve alternating voltages of equal amplitude and equally spaced in phase by thirty electrical degrees and booster transformer means for providing secondary voltages mid-way between pairs of said twelve alternating voltages.

It is another object to provide a battery charger having a booster arrangement of such type in a three phase rectifier circuit comprising a main transformer connected in delta, twelve phase, quadruple zig-zag Y configuration and booster transformer means comprising a plurality of primaries connected in booster primary delta configuration in parallel with the main primary delta and a plurality of booster secondary windings, each of which is connected to one of said zig-zags.

It is another object to provide a battery charger having such a booster arrangement in a three phase rectifier circuit comprising a main transformer connected in Y delta, twelve phase, quadruple Y configuration, and booster transformer means comprising a plurality of primaries connected in booster primary delta configuration in parallel with the main primary delta and a plurality of booster secondary windings, each of which is connected to one of the arms of the quadruple Y's.

It is a further object of the present invention to provide a unique booster type control arrangement in a rectifier circuit having transformer connections from three phase delta to twelve phase quadruple zig-zag, the booster transformers being connected in primary delta configuration, and each of the three arms of the delta comprising two booster primaries and two parallel connected and oppositely poled controlled rectifiers inserted in series. Inductively coupled with each booster primary winding are two secondary booster windings, each of which is connected in series with one of the main transformer quadruple zig-zags according to a prescribed pattern.

It is another object to provide a battery charger having booster arrangement in a three phase rectifier circuit utilizing six booster transformers, each having a primary winding and two secondary windings in which the six primary windings are arranged in delta configuration such that each arm of the delta comprises a series connection of a pair of said primary windings and a pair of controlled rectifiers.

It is another object to provide certain unitary booster transformer means which are also operative in the manner of the booster transformers described in the foregoing objects.

These and other objects, advantages and features of the invention will be apparent to those skilled in the art from the following detailed description, taken in conjunction with the accompanying drawings, in which:

FIGURES 1 and 2, when placed side by side, comprise a schematic illustration of one embodiment of the system of the invention;

Figure 14:
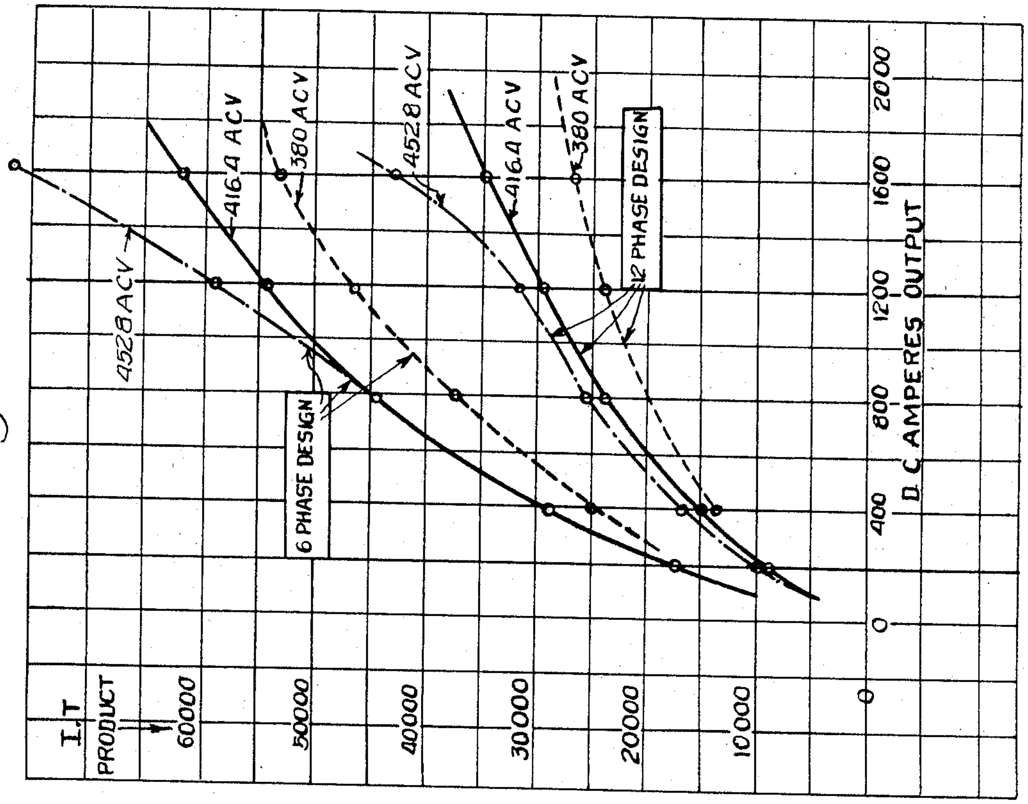
Figure 18:
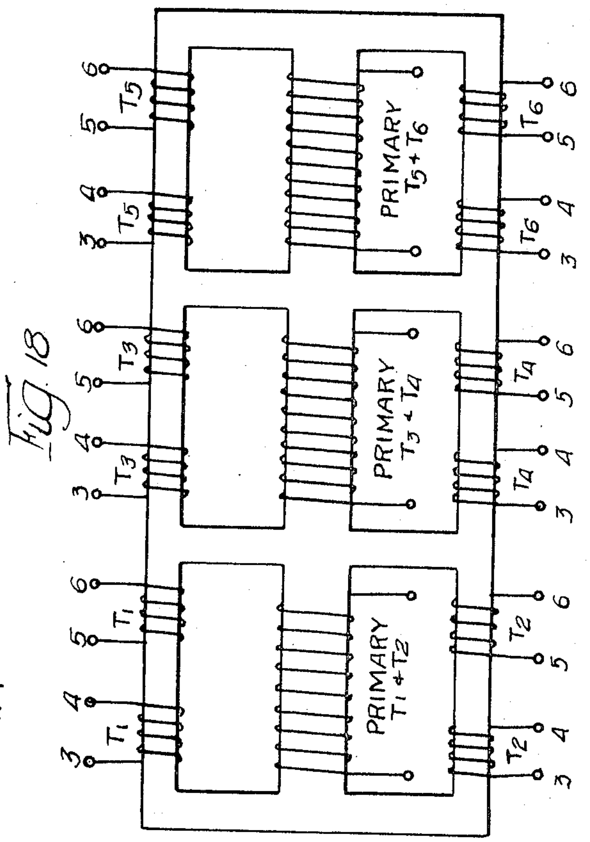
Figure 17:
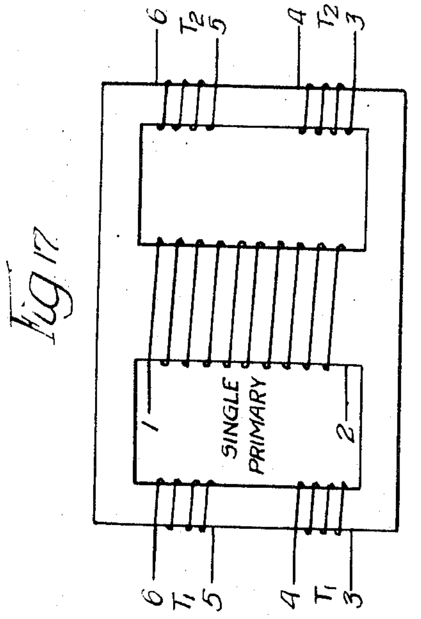
Figures 15, 16:
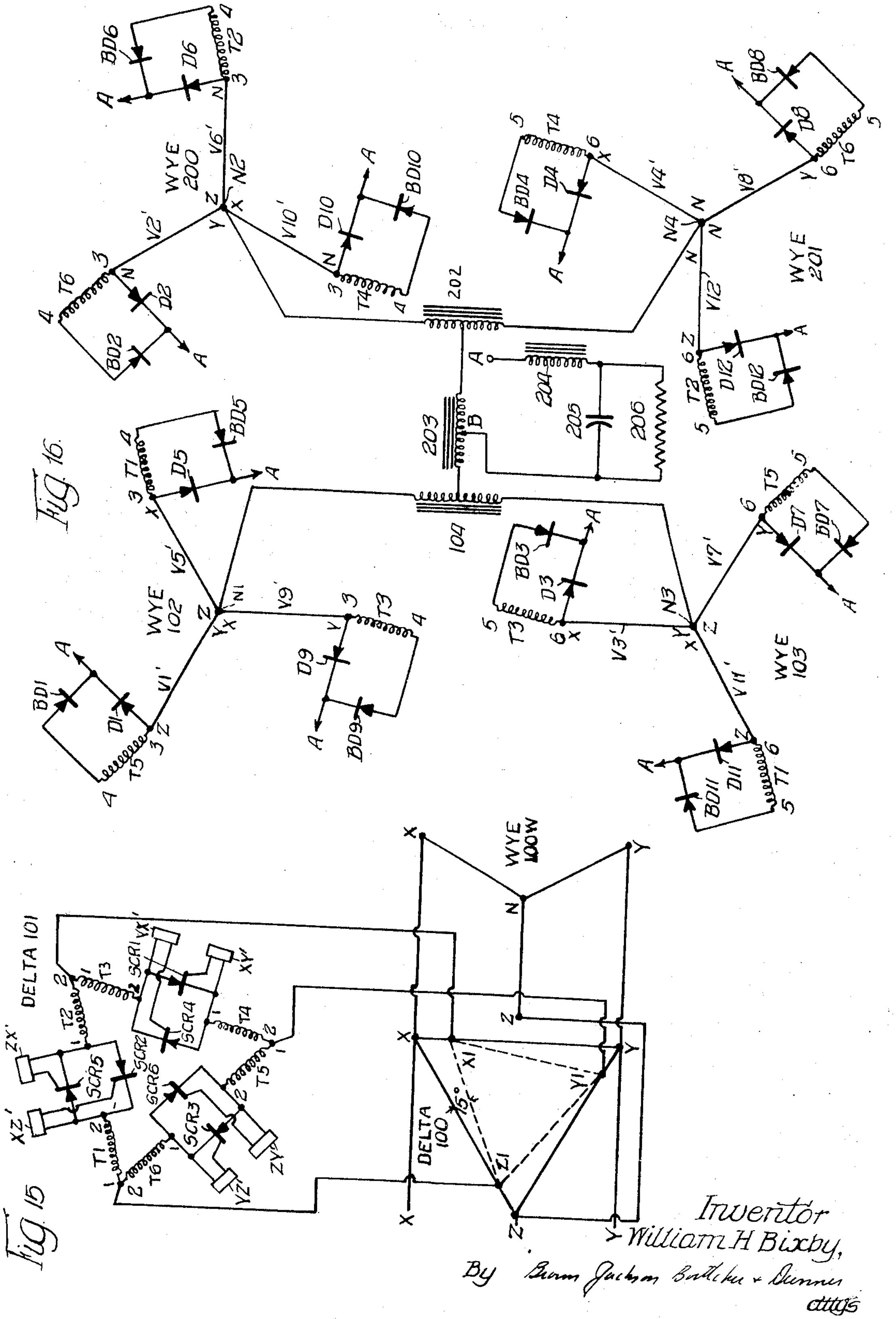

FIGURE 14 is the graph of the telephone influence factor (TIF) versus load current and line voltage for a six phase rectifier with booster of the type described in Ser. No. 311,053 and for a twelve phase rectifier with a booster of the present invention, the ordinate being I.T. product and the abscissa being DC amperes output. This graph assumes high filter choke inductance and a normal amount of transformer and line reactance;

FIGURES 15 and 16, when placed side by side comprise a schematic showing of a further embodiment of the invention;

FIGURE 17 is a showing of a transformer construction in which two booster transformers are combined into a single unit having one primary winding; and FIGURE 18 is a showing of a transformer shell type three phase construction with a winding arrangement as shown in FIGURE 17, whereby six booster transformers are incorporated into a single unit having three primary windings.

*General description*

Figure 1:
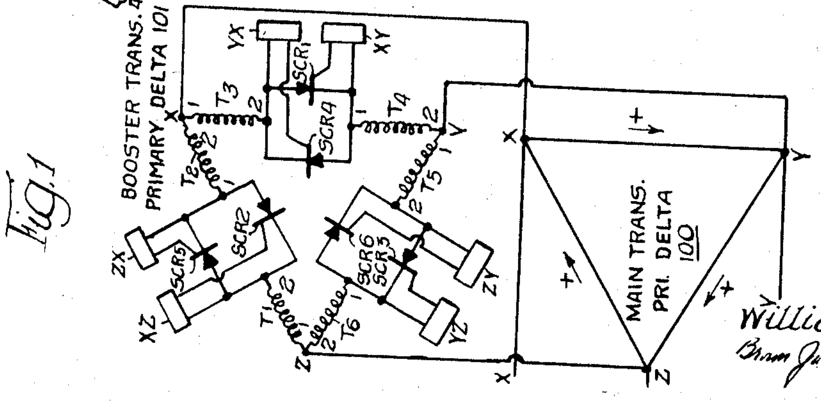

With reference now to the lower left portion of FIGURE 1, lines X, Y, and Z are incoming from a three phase power source to the XY, YZ, and ZX windings of the main transformer primary delta 100. Lines X, Y, and Z are also connected to corresponding points of booster transformer primary delta 101 made up of the six primaries 1–2 of the booster transformers T1–T6, as shown. The deltas of the main transformer and the booster transformer are thus connected in parallel.

In order to readily distinguish the main transformer windings from the booster transformer windings and to facilitate the representation of voltages thereacross as vectors, the main transformer windings are shown as straight lines whereas the booster windings are illustrated in turns fashion. For example, the three main transformer primary delta windings and associated voltages are illustrated by straight lines XY, YZ, and ZX. It is assumed that on one-half cycle when X is more positive than Y (i.e., on the positive half cycle) current flows from X to Y; and on the succeeding half-cycle when Y is more positive than X (i.e., on the negative half cycle), current flows from Y to X.

The XY arm of delta 101 comprises the 1–2 primaries of booster transformers T3 and T4 connected in series through parallel inverse-connected silicon controlled rectifiers SCR–1 and SCR–4. The YZ arm comprises the 1–2 primaries of booster transformers T5 and T6 connected in series through parallel inverse-connected silicon controlled rectifiers SCR–3 and SCR–6. The ZX arm comprises the 1–2 primaries of booster transformers T1 and T2 connected in series through parallel inverse-connected silicon controlled rectifiers SCR–2 and SCR–5.

The firing circuit of SCR–1 is designated XY; that of SCR–2 is designated XZ; that of SCR–3 is designated YZ; etc. These firing circuits can be considered to be connected to the corresponding firing circuits in FIGURES 1, 5, and 6 of the above identified application having Ser. No. 409,855, which is assigned to the assignee of the present invention. As explained in the aforementioned applications, these firing circuits are all advanced or retarded by control circuitry in a manner to keep the load voltage essentially constant within prescribed limits even though the load current and incoming line voltage may vary.

The order of energization of the control circuits and firing of the silicon controlled rectifiers SCR–1–SCR–6, assuming that the boosters are turned on, is as follows:

| | |
|---|---|
| XY–**SCR–1** | YX–**SCR–4** |
| XZ–**SCR–2** | ZX–**SCR–5** |
| YZ–**SCR–3** | ZY–**SCR–6** |

Figure 2:
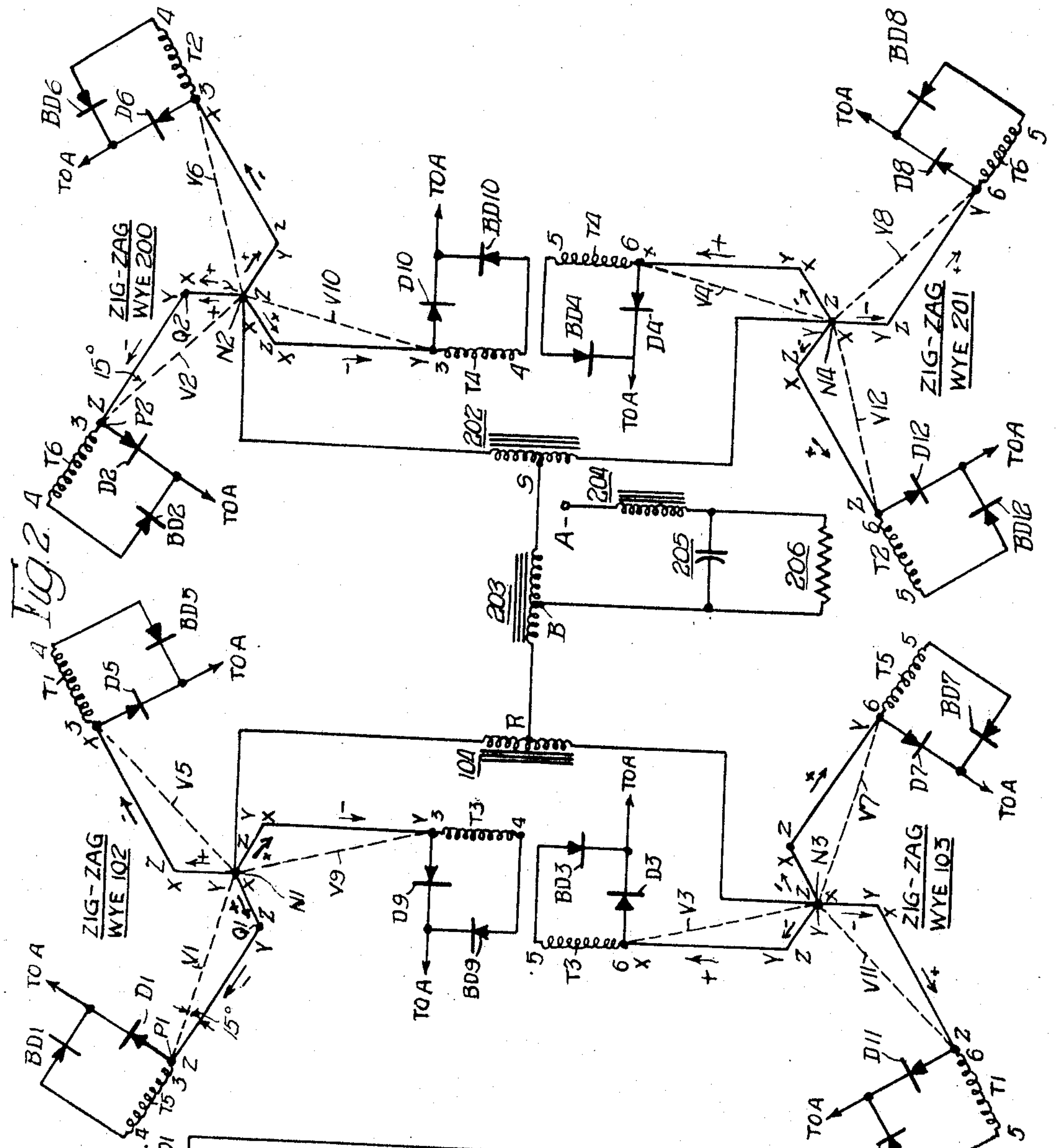

The secondary windings of the main transformer (MT) and of the booster transformer (BT) as shown in FIGURE 2 connected in quadruple zig-zag Y configuration by means of twenty-four rectifying diodes D1–D12, BD1–BD12 and three interphase reactors 104, 202, and 203, as shown. The load circuit comprising load 206, filter capacitor 205, and filter reactor 204 is connected on one side to the center tap point B of the middle interphase reactor 203, and on the other side to all points designated A in the various quadruple zig-zag circuits.

More specifically, at the upper left hand part of FIGURE 2 is the zig-zag Y 102; at the lower left hand part of FIGURE 2 is the zig-zag Y 103. Y's 102 and 103 are connected via their center points N1 and N3 to upper and lower ends respectively of interphase reactor 104.

In the upper right hand part of FIGURE 2 is the zig-zag Y 200; and in the lower right hand part of FIGURE 2 is the zig-zag Y 201. Y's 200 and 201 are connected via their center points N2 and N4 to the upper and lower ends respectively to interphase reactor 202.

The left end terminal of interphase reactor 203 is connected to the center tap R of reactor 104; the right end terminal is connected to the center tap S of reactor 202; and the center tap B is connected to the load circuit 206 as aforestated.

During the operation of the system, the voltages of the points N1, N2, N3, and N4 vary. As point N1 is connected to the one end of reactor 104 and the point N3 is connected to the other end thereof, the voltage of the center tap R will be the algebraic mean of the two voltages at points N1 and N3. In a similar manner, the voltage of the center tap S of reactor 202 will be the algebraic mean of the voltages at points N2 and N4. Furthermore the voltage of the center tap B of reactor 203 will be the algebraic mean of the voltages of the points R and S. Thus, the voltage of the point B will be the algebraic mean of the four voltages at points N1, N2, N3, and N4.

With the boosters turned completely off by the control circuits, such as YZ, etc., so that no current flow over the booster primary windings T1–T6 will occur, point R will have six voltage pulses per cycle of the input voltage, point S will have six voltage pulses which are 180° out of phase with the pulses at point R; and point B will have twelve voltage pulses per cycle.

With the boosters turned completely on, points N1 and N2 (i.e., the upper ends of reactors 104 and 202) will have the same potential; points N3 and N4 will have the same potential (which in general is different from that of N1 and N2); points R and S will have the same potential and will have six voltage pulses per cycle in phase; and point B will have the same potential as R and S and will have six voltage pulses per cycle. Thus with the boosters off or full-on a correspondence will be observed between the number of voltage pulses at point B, and the number of current steps in the incoming line current.

With the boosters turned partially on, the waveforms become more complex and will be considered further hereinafter.

With reference to FIGURE 2, a further description of the secondary circuits is now set forth. The secondary windings of the four Y's 102, 103, 200, 201 in the main transformer MT are drawn parallel to the primary windings XY, YZ, ZX, and identified by like designations. For example, in the zig-zag Y 102, the common point of which is N1, short lines XY, YZ, and ZX connected to point N1 represent windings and corresponding secondary voltage vectors. Connected to the other ends of these short lines are longer lines ZX, XY, and YZ respectively, representing windings having more turns and correspondingly larger voltage vectors. Thus, short ZX and long YZ can be considered as secondary voltage vectors which give a resultant voltage vector N1–P1 designated VI. In the triangle N1, P1, Q1, the length of ZX and YZ are chosen so that V1 is 15° counter-clockwise from YZ (i.e., the voltage represented by V1 is advanced 15° from the voltage represented by YZ). Thus, in the triangle N1, P1, Q1 angle Q1 is 120°, angle P1 is 15°, and angle N1 is 45°. Accordingly, the turns in the windings ZX and YZ are related as follows:

$$\frac{\text{Turns } YZ}{\text{Turns } ZX}=\frac{\text{Sin } 45°}{\text{Sin } 15°}$$

so that in number of turns, $YZ=(1+\sqrt{3})ZX$ or approximately 2.73 ZX.

Also, assuming that instantaneously, short vector ZX is at +210°, then vector V1 will be at 210°−45° or 165°.

Similarly in zig-zag Y 200, short secondary winding XY is connected at one end to the Y 200 center point N2 and, at the other end, will be connected in series with long secondary winding YZ. In the triangle N2, P2, Q2, the lengths of XY and YZ are the same as the corresponding lengths in the triangle N1, P1, Q1, so that an angle of 15° obtains between vector V2 and YZ, vector V2 being 15° clockwise from YZ. In the triangle N2, P2, Q2, angle Q2 is 120°, and angle P2 is 15° and angle N2 is 45°. With short vector XY at 90° vector V2 will be at 90°+45° or 135°. Thus, vector V2 is spaced 30° clockwise from vector V1.

By similar reasoning it can be shown that the various resultant vectors would be instantaneously spaced as shown 30° apart clockwise as follows:

| | |
|---|---|
| V1 at +165° | V7 at +345° |
| V2 at +135° | V8 at +315° |
| V3 at +105° | V9 at +285° |
| V4 at +75° | V10 at +255° |
| V5 at +45° | V11 at +225° |
| V6 at +15° | V12 at +195° |

These twelve vectors V1–V12 then can be considered as a system of equally spaced counter-clockwise rotating vectors arranged in four commutating groups identified by Y's 102, 103, 200 and 201.

*Operation of system with boosters turned off*

Assuming that the boosters are not turned on, in the commutating group of Y 102, the vectors V1, V5, and V9 will effect commutation of associated diodes in the order D1, D5, D9. That is, the voltage represented by V1 will become the most positive, causing diode D1 to conduct for 120°; and thereafter V5 will become most positive, causing diode D5 to conduct for the next 120°; and thereafter V9 will become most positive, causing diode D9 to conduct for the last 120°. As a diode such as D1 conducts, it cuts off the previously conducting diode, such as D9.

In the commutating group of Y 200, the vectors V2, V6, V10 effect commutation of the associated diodes in the order D2, D6, D10; in the commutating group of Y 103, the vectors V3, V7, and V11 effect commutation in the order D3, D7, D11; and in the commutating group of Y 201, the vectors V4, V8, and V12 effect commutation in the order D4, D8, D12.

Because of the 30° spacing between vectors V1–V12, the twelve vectors effect commutation of the associated diodes in the order of 1 . . . 12, causing the associated diodes D1–D12 to begin conduction in the order of D1, . . . , D12. However, because the vectors are divided up into four autonomous commutating groups, each diode conducts for 120°. Thus, four diodes, i.e. one in each Y, will always be conducting as is graphically shown in FIGURE 3.

Figures 3, 4:
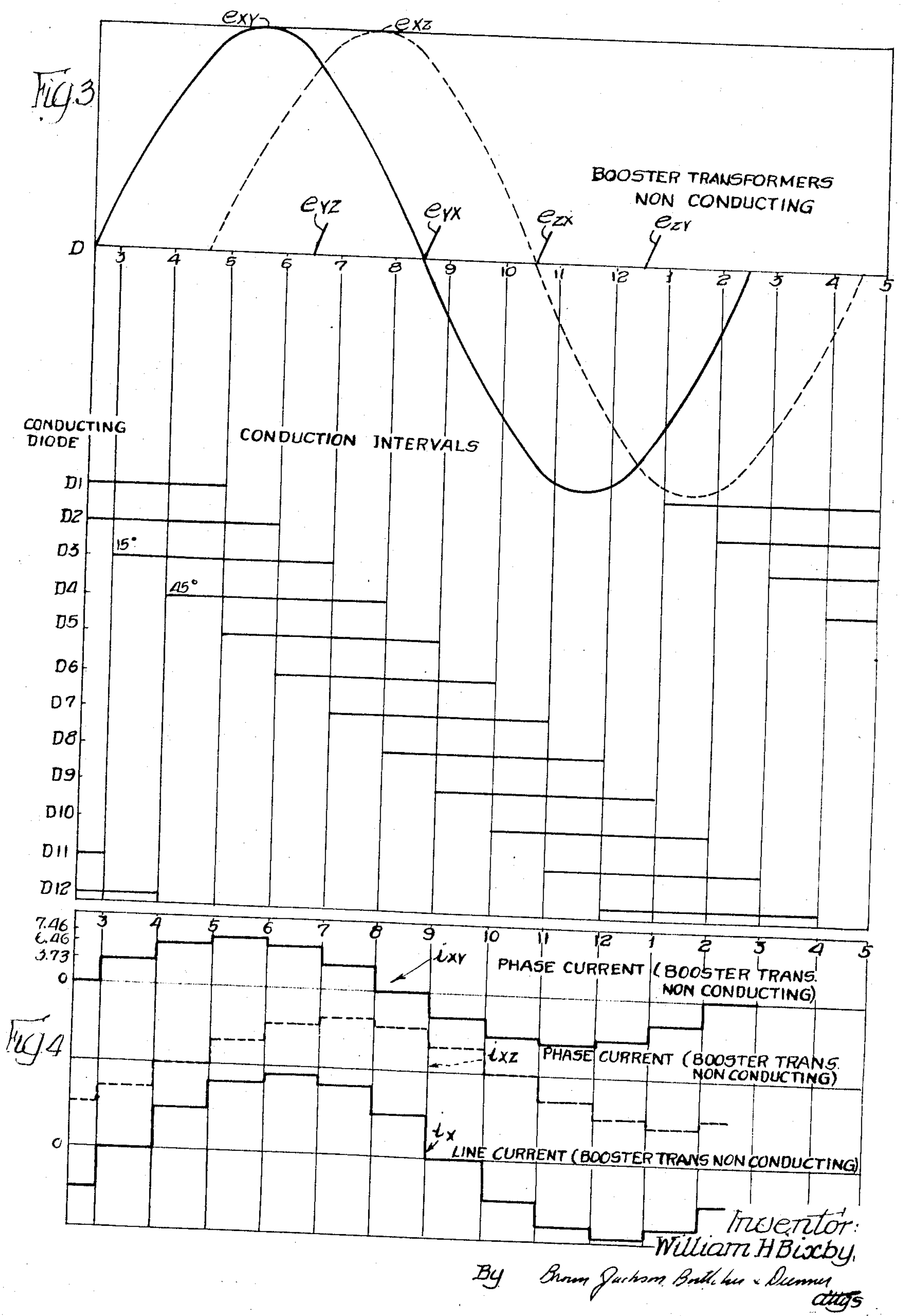
FIGURE 3 illustrates the conduction intervals of the twelve main rectifying diodes of the system with relation to the phase voltages of the alternating current source under "no boost" condition.
FIGURE 4 illustrates the primary delta phase currents $i_{xy}$ and $i_{xz}$, and the resulting primary line current $i_x$ under the no boost condition of FIGURE 3.

More specifically with reference to FIGURE 3 which graphically illustrates the conduction intervals of the diodes relative to the primary phase voltages, with the booster transformer nonconducting, curve $e_{xy}$ represents the primary phase XY voltage. Looking at Y 103 of FIGURE 2, it can be seen that vector V3 is 15° ahead of long vector XY, and, accordingly, will cause commutation at the 15° point of $e_{xy}$ shown in FIGURE 3 as illustrated by the conduction of diode D3 at this point. Diode D3 conducts for 120°, as illustrated.

Looking at Y 201 of FIGURE 2, it can be seen that vector V4 is 15° behind long vector XY, and, accordingly, will cause commutation at the 45° point of $e_{xy}$, shown in FIGURE 3, as illustrated by the point of conduction of diode D4. D4 conducts for 120°, as illustrated.

The commutations effected by the other pairs of vectors are illustrated in a like manner as shown in FIGURE 3. With the silicon controlled rectifiers SCR1–6 (FIGURE 1) in the booster primary circuit turned completely off by the control circuits XY, etc., there is no current contribution by the booster transformers and the rectifier circuit will perform as a twelve phase rectifier circuit utilizing the main transformer only.

Digressing, during the positive half-cycle of $e_{xy}$ of FIGURE 3, point X of primary delta 100 (FIGURE 1) is positive with respect to point Y and conventional current flow is from X to Y, as shown by the downwardly pointing arrow. The plus sign adjacent this arrow designates positive current. During the negative half-cycle of $e_{xy}$, point Y of delta 100 is positive with respect to point X, and conventional current flow is from Y to X and designated negative current.

It should be recalled that in a transformer, current in the secondary winding flows in the opposite direction to that in the primary winding. Accordingly, as plus current in the primary winding XY was designated by a downwardly pointing arrow, plus current in the associated secondaries XY (FIGURE 2) will be indicated by upwardly pointing arrows. It will be understood that minus current in the associated secondaries XY will be indicated by a downwardly pointing arrow.

Similarly, during the positive half cycle of $e_{yz}$ of FIGURE 3, point Y of primary delta 100 (FIGURE 1) is positive with respect to point Z, and conventional current flow is from Y to Z as shown by the arrow pointing toward the left. The plus sign adjacent the arrow designates positive current. During the negative half-cycle of $e_{yz}$, point Z is positive with respect to point Y and current flow is from Z to Y and is designated negative current.

Accordingly, plus current in the associated secondaries YZ will be indicated by an arrow pointing to the right, and minus current in the associated secondaries YZ will be indicated by an arrow pointing to the left.

Similarly, during the positive half-cycle of $e_{zx}$ of FIGURE 3, point Z of primary delta 100 (FIGURE 1) is positive with respect to point X, and conventional current flow is from Z to X as shown by the arrow pointing to the right. The plus sign adjacent the arrow designates positive current. During the negative half-cycle of $e_{zx}$, point X is positive with respect to point Z, and current flow is from X to Z and is designated negative current.

Current in the primary windings is determined by current drawn by the secondaries. Accordingly, the amount of current in the primary XY phase winding of delta 100 varies at thirty degree intervals as determined by current drawn by the various secondaries. The amount of secondary current is determined in any given one of these intervals by the particular ones of the diodes in the various zig-zags which are conducting. The resulting primary XY current drawn is illustrated graphically by the $i_{xy}$ curve of FIGURE 4.

The manner in which conduction of these diodes results in the waveform $i_{xy}$ of FIGURE 4 is now set forth. With reference to FIGURE 3, it is seen that prior to the conduction of diode D3, the diodes D1, D2, D11 and D12 are conducting.

Referring to FIGURES 1 and 2, none of the main transformer secondary windings which are connected to diode D1 has XY current therein, as only YZ and ZX secondary windings are connected to diode D1.

With reference to diode D2, it will be seen that short secondary winding XY in Y 200 is contributing current to diode D2, which is arbitrarily designated +1 unit of secondary current. With reference to diode D11, short secondary winding XY in Y 103 is contributing current to diode D11, which is designated −1 unit of secondary current. With reference to diode D12 no main transformer secondary winding in Y 201 is contributing XY current to diode D12.

Accordingly, +1 unit provided by D2 and −1 unit provided by D11 equals 0 units of secondary XY current supplied to the load circuit. Accordingly, no current will be drawn by the primary XY phase. Thus, the $i_{xy}$ curve in FIGURE 4 starts at 0.

After diode D3 conducts, it will be seen by reference to FIGURE 3 that the following diodes are conducting: D1, D2, D3, and D12. By similar analysis it will be seen that no XY current flows through D1, +1 unit of secondary XY current is supplied through D2 by the short XY winding, +2.73 units of secondary current is supplied through D3 by the long secondary XY winding, and no XY current flows through D12. Accordingly, $$0+1+2.73+0=+3.73$$

units of secondary current are provided to the load circuit, and accordingly, +3.73 primary units of current will be flowing in the primary XY winding of the main transformer MT.

Referring to the $i_{xy}$ graph of FIGURE 4, the height of the current curve for the 30° following the commutation of diode D3 represents +3.73 units of primary current.

The following chart will illustrate the derivation of the current curve $i_{xy}$:

| After commutation of— | Diodes conducting | Units of secondary current in the XY phase | Units of primary current in the XY phase |
|---|---|---|---|
| D3 | D1 | 0 | +3.73 |
| | D2 | +1 | |
| | D3 | +2.73 | |
| | D12 | 0 | |
| D4 | D1 | 0 | +6.46 |
| | D2 | +1 | |
| | D3 | +2.73 | |
| | D4 | +2.73 | |
| D5 | D2 | +1 | +7.46 |
| | D3 | +2.73 | |
| | D4 | +2.73 | |
| | D5 | +1 | |
| D6 | D3 | +2.73 | +6.46 |
| | D4 | +2.73 | |
| | D5 | +1 | |
| | D6 | 0 | |
| D7 | D4 | +2.73 | +3.73 |
| | D5 | +1 | |
| | D6 | 0 | |
| | D7 | 0 | |
| D8 | D5 | +1 | 0 |
| | D6 | 0 | |
| | D7 | 0 | |
| | D8 | −1 | |
| D9 | D6 | 0 | −3.73 |
| | D7 | 0 | |
| | D8 | −1 | |
| | D9 | −2.73 | |
| D10 | D7 | 0 | −6.46 |
| | D8 | −1 | |
| | D9 | −2.73 | |
| | D10 | −2.73 | |
| D11 | D8 | −1 | −7.46 |
| | D9 | −2.73 | |
| | D10 | −2.73 | |
| | D11 | −1 | |
| D12 | D9 | −2.73 | −6.46 |
| | D10 | −2.73 | |
| | D11 | −1 | |
| | D12 | 0 | |
| D1 | D10 | −2.73 | −3.73 |
| | D13 | −1 | |
| | D12 | 0 | |
| | D1 | 0 | |
| D2 | D11 | −1 | 0 |
| | D12 | 0 | |
| | D1 | 0 | |
| | D2 | +1 | |
| D3 | D12 | 0 | +3.73 |
| | D1 | 0 | |
| | D2 | +1 | |
| | D3 | +2.73 | |

Referring to FIGURE 3 again, it will be seen that three voltage curves $e_{xy}$, $e_{yz}$, and $e_{zx}$, which are 120° apart and correspond to primary phases XY, YZ, and ZX respectively, are drawn out or indicated thereon. Also, three additional voltage curves $e_{xz}$, $e_{yx}$, and $e_{zy}$ which are the negatives of the first three curves are also drawn out or indicated.

Current curves $i_{xy}$ and $i_{xz}$ shown in FIGURE 4 correspond to voltage curves $e_{xy}$ and $e_{xz}$ shown in FIGURE 3. Similar current curves could be drawn out for each of the other voltage curves.

The line current in the incoming line X (FIGURE 1) is equal to the algebraic sum of the phase currents flowing from the two primary phase windings XY, XZ (FIGURE 1) connected thereto. Thus, the line current $i_x=i_{xy}+i_{xz}$ is shown as the third curve in FIGURE 4. Similarly line current $i_y=i_{yx}+i_{yz}$ and will have twelve steps; also line current $i_z=i_{zx}=i_{zy}$ and will have twelve steps. As noted above, it is well known that if the rectifier circuits connected to the secondary are supplying "p" pulses per cycle to the load under balanced conditions with a three phase source, we will have only those harmonic components of current present in the input line which are of the order of $np\pm1$. In the foregoing example in which no boosters were turned on, twelve pulses per cycle are supplied to the load circuit, and the harmonic components of current in the line wires X, Y, and Z connected to a three phase source, in addition to the fundamental, will be the 11th, 13th, 23rd, 25th, 35th, 37th, etc.

*Booster operation*

It should be observed that booster transformer T1 (FIGURE 1) has its primary winding 1–2 connected as shown in delta 101, and two secondary windings 3–4 in Y 102 and 5, 6, in Y 103. The secondary winding 3–4 in zig-zag Y 102 is connected in series with main secondary windings YX and ZX. The direction of its turns is such that the voltage produced is in the same direction as the ZX voltage. The other of these secondary windings 5–6 in zig-zag Y 103 is similarly connected. The other booster transformers T2–T6 each have a primary winding connected as shown in delta 101 and two secondary windings connected in the various Y's as shown.

It will be noted that booster transformers T5 and T6, for example, introduce voltages in the secondary windings T5 (3–4) and T6 (3–4) having a phase position which is midway between the phase positions of the vectors V1 and V2. Since the primaries of transformers T5 and T6 are connected in series, the voltage supplied by their respective secondary windings T5 (3–4) in Y 102 and T6 (3–4) in Y 200 automatically will be so proportioned as to create equal current flows in these secondary windings. Thus, when the booster primary windings T5, T6 in Y's 102 and 200 are energized by the firing of one of the switching devices SCR6 of the switching pair SCR3, SCR6 (here shown as silicon controlled rectifiers connected in inverse parallel), the voltage applied to point A connected to the filter reactor 204 will be raised relative to point B and the action of the booster transformers with their primaries connected in series will be such as to insure current sharing by the respective secondary legs of the main transformer without placing an additional burden in the interphase reactors. On the next half-cycle of the input voltage, SCR 3 will fire energizing booster secondary windings T5 (6–5) and T6 (6–5) in Y's 103 and 201.

*Operation with boosters turned on completely*

When the control circuits YX, XY, etc., turn the switching devices SCR1–SCR6 on with no retard angle, the corresponding diodes of the commutating groups Y 102, 200 for example, having neutral points N1 and N2 respectively will be forced to commutate substantially simultaneously by the booster transformers. Thus, corresponding diodes BD1 and BD2 in the respective groups will begin to conduct substantially simultaneously. Diodes BD5 and BD6; and BD9 and BD10 in the respective groups are connected in a like relation. Thus, the instant of commutation of two groups such as Y 102 and 200, for example, will be midway between their respective times of commutation when no booster action is present. Commutating groups having neutral points N3 and N4 operate in a similar manner.

Figure 5:
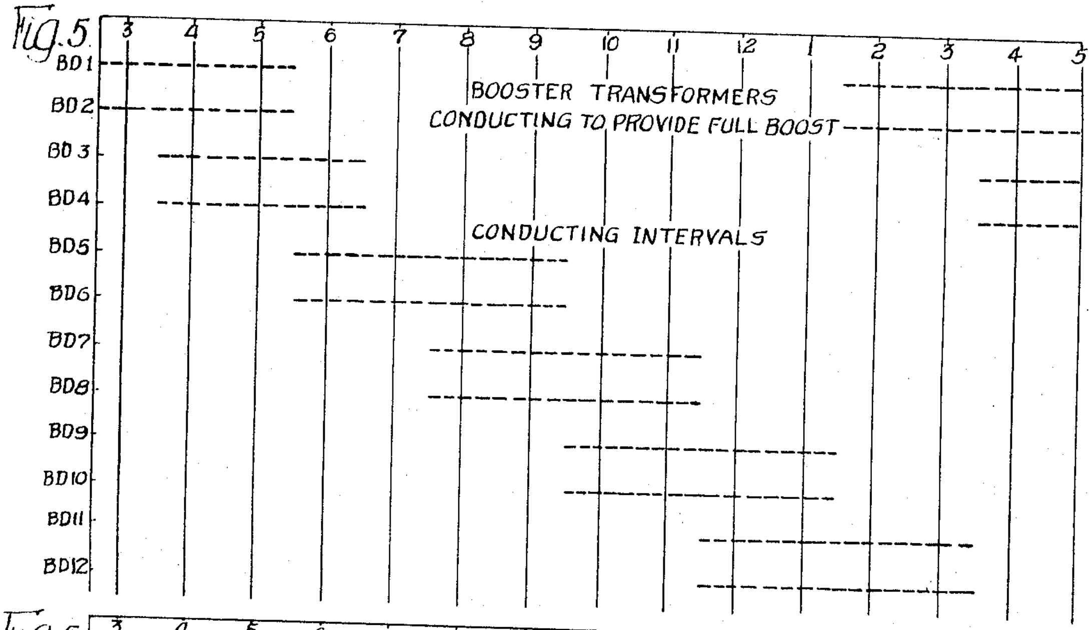
FIGURE 5 illustrates the conduction intervals of the twelve booster rectifying diodes of the system with relation to the phase voltages (FIGURE 3) of the alternating current source under the full boost condition.

With boosters turned on completely, the rectifier circuit performs similar to a six pulse assembly with zero angle of phase retard in the power circuit. This is illustrated in FIGURE 5 in which the broken lines represent the intervals of booster diode conduction. The conduction interval of the booster diodes are represented by broken lines to distinguish such conduction from the conduction intervals of the other diodes D1–D12 which are represented by solid lines. When the boosters are turned full on, diodes D1–D12 are back biassed by diode BD1–BD12 and do not conduit during any portion of the cycle. Referencing of FIGURE 5 to the curves at the top of FIGURE 3, it will be seen that diode BD3, for example, begins conduction at the 30° point $e_{xy}$ (FIGURE 3) which is 15° later than the beginning of conduction of diode D3 as illustrated in FIGURE 3. Also, diode BD4 begins conduction at 30° point of $e_{xy}$ which is 15° earlier than the beginning of conduction of diode D4 as illustrated in FIGURE 3. The commutation of the other pairs of booster diodes is also shown in FIGURE 5.

Figure 6:
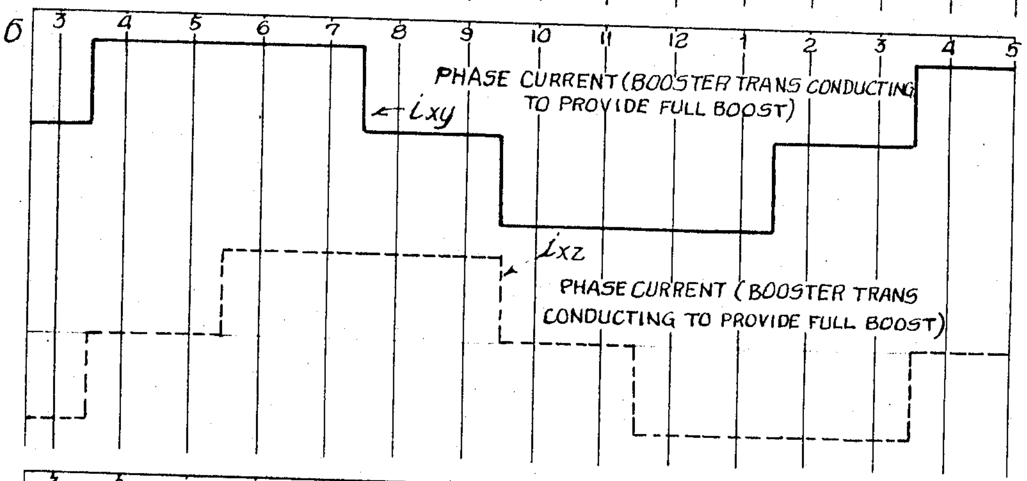
FIGURE 6 illustrates the primary delta phase currents $i_{xy}$ and $i_{xz}$ under the full boost condition.
Figure 7:
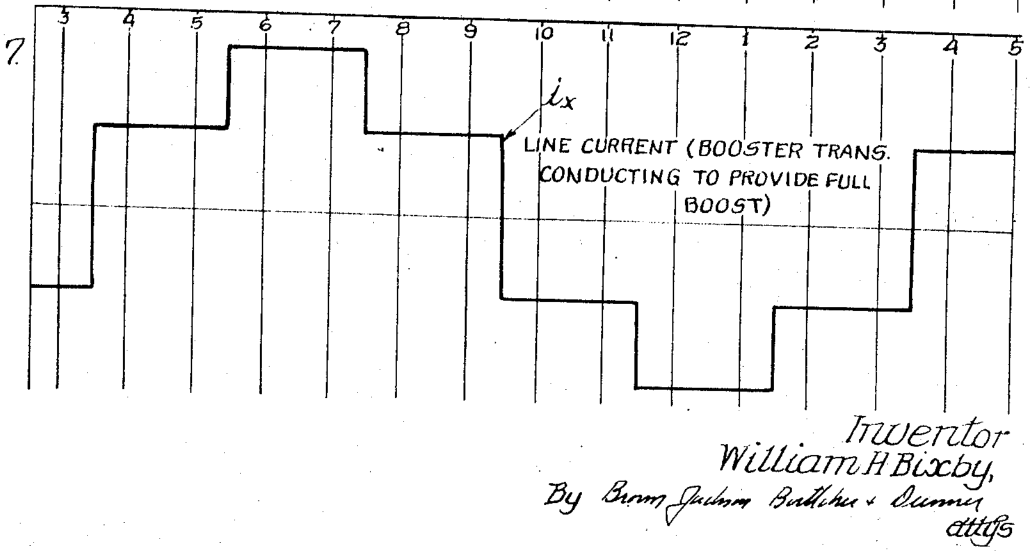
FIGURE 7 illustrates the primary line current $i_x$ resulting from the delta phase currents $i_{xy}$ and $i_{xz}$ of FIGURE 6.

Referring to FIGURES 6 and 7, phase current curves $i_{xy}$ and $i_{xz}$, and line current curve $i_x$ are constructed in a fashion similar to the corresponding curves of FIGURE 4.

In this limiting condition with boosters full on, the harmonic components of current in the input lines according to formula $np+1$ would be, in addition to the fundamental, the 5th, 7th, 11th, 13th, 23rd, 25th, etc. However, with automatic load voltage control, this condition would only occur under circumstances where maximum output voltage is required from the rectifier circuit while the source voltage is simultaneously at its minimum specified value. This is a condition which would normally give the lowest disturbance from current components in the input line wires connected to a six pulse rectifier, and this disturbance is still further reduced in the present case by the additional leakage reactance introduced into the commutating groups by the booster transformer.

*Operation with boosters turned on with retard angle*

When the control circuits YX, XY, etc., turn the switching devices SCR1–SCR6 on at a retard angle, corresponding diodes of the commutating groups Y 102, 200, for example, having neutral points N1 and N2 respectively are forced to commutate substantially at the same time by the booster transformers, except for slight variation occasioned by transformer (and line) reactance. The commutating groups having neutral points N3 and N4 operate in a similar manner.

Figure 8:
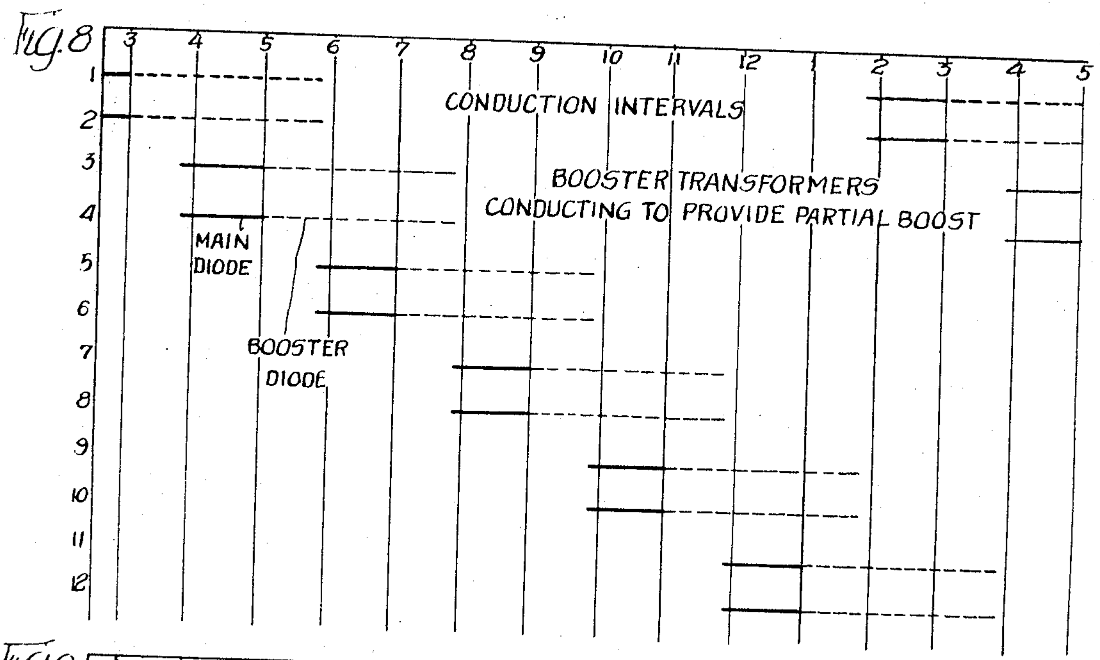
FIGURE 8 illustrates the conduction intervals of the twelve main rectifying diodes and the twelve booster rectifying diodes of the system with relation to the phase voltages (FIGURE 3) of the alternating current source under the partial boost condition, and specifically for a retard angle of 45° from the full-on condition.

Generally stated, with boosters turned on with a retard angle, the rectifier circuit performs like a twelve pulse assembly prior to booster turn-on and like a six pulse assembly after booster turn-on. With reference to FIGURE 8, the solid lines represent conduction intervals of the main diodes D1–D12 and the broken lines represent the intervals of conduction booster diode BD1–BD12. When the boosters are turned on, diodes D1–D12 are backbiassed by diodes BD1–BD12 and do not conduct. Referencing of FIGURE 8 to the curves at the top of FIGURE 3, it will be seen that diodes D3 and D4, for example, begin conduction at an angle slightly lagging the 30° point of $e_{xy}$ (approximately 6°–8° lag). The booster diodes BD3 and BD4 begin conduction at 45° beyond the 30° point of the $e_{xy}$ phase. The commutation of the other pairs of main diodes and booster diodes is also shown in FIGURE 8.

Figure 9:
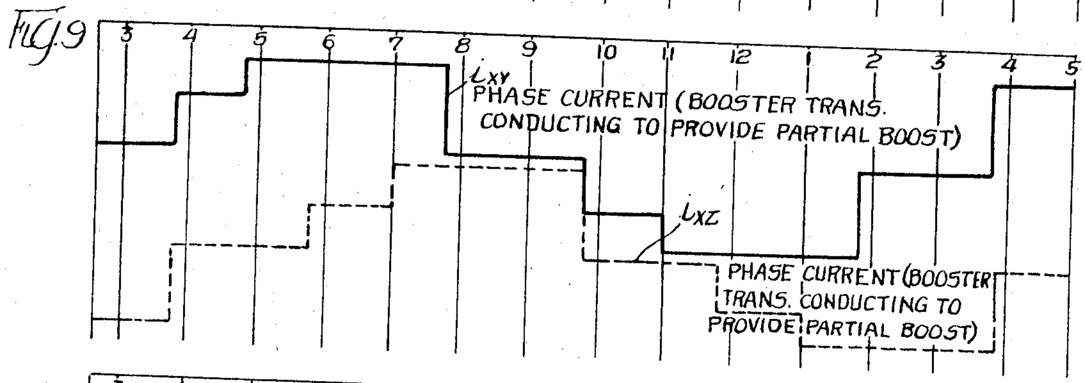
FIGURE 9 illustrates the primary delta phase currents $i_{xy}$ and $i_{xz}$ under the partial boost condition.
Figure 10:
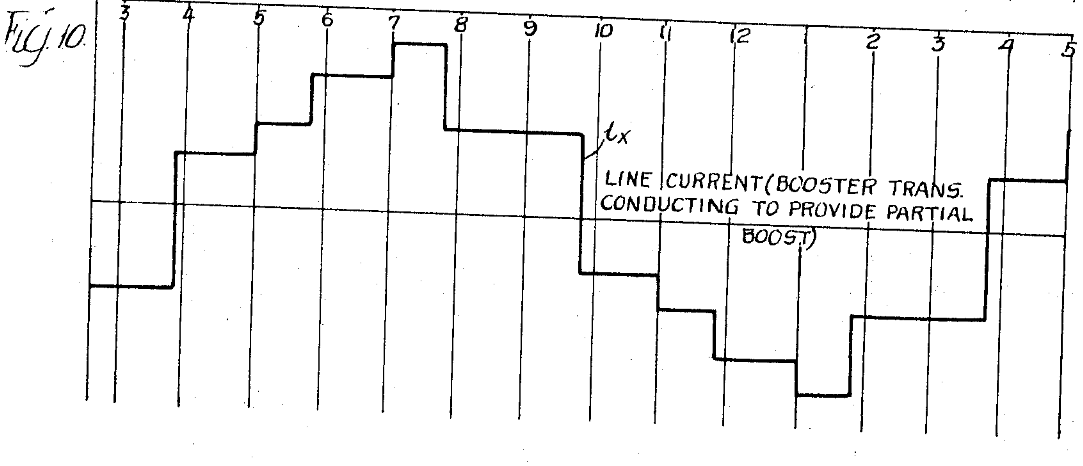
FIGURE 10 illustrates the primary line current $i_x$ resulting from the delta phase currents $i_{xy}$ and $i_{xz}$ of FIGURE 9.

Referring to FIGURES 9 and 10, phase current curves $i_{xy}$ and $i_{xz}$, and line current curve $i_x$ are constructed in a manner similar to the corresponding curves of FIGURE 4. It should be appreciated that the curves of FIGURES 9 and 10 assumes zero transformer (and line) reactance. As will now be shown in more detail, additional factors including transformer (and line) reactance will result in additional steps in the $i_x$ curve.

Figures 12A, 12B, 12C, 12D, 12E:
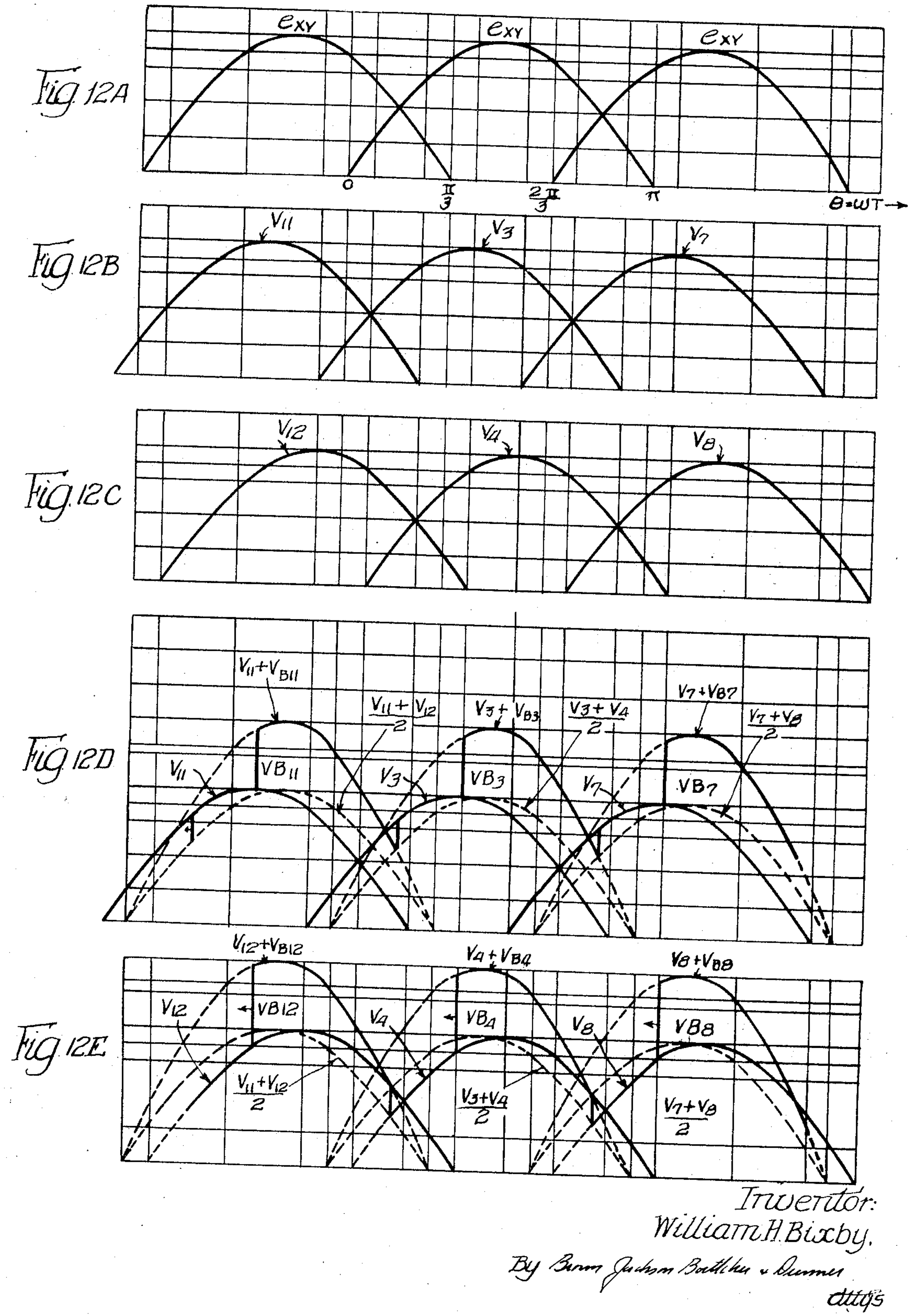
FIGURE 12A shows the positive half-cycles of primary voltages $e_{zx}$, $e_{xy}$, and $e_{yz}$.
FIGURE 12B shows the positive half-cycle of vectors V11, V3, and V7 without booster control.
FIGURE 12C shows the positive half-cycles of vectors V12, V4, and V8 without booster control.
FIGURE 12D illustrates voltage curves for booster control in the commutating group of N3 with zero transformer (and line) reactance.
FIGURE 12E shows the voltage curves for booster control in the commutating group N4 with zero transformer (and line) reactance.

Referring now to FIGURES 12A–12E which are to be aligned vertically, it should be noted that the ordinate represents voltage and the abscissa represents time. More specifically, FIGURE 12A illustrates the positive half-cycles of primary phase voltages $e_{zx}$, $e_{xy}$, and $e_{yz}$. The positive half-cycles of vectors V11, V3, and V7 without booster control are shown in FIGURE 12B; and the positive half-cycles of vectors V12, V4, and V8 without booster control are shown in FIGURE 12C. Voltage curves illustrating operation with booster control for the commutating group of Y 103 which has common point N3 assuming zero transformer (and line) reactance are shown in FIGURE 12D, and FIGURE 12E shows the same for the commutating group of Y 201 having common point N4. It should be observed that the curves of FIGURE 12B are advanced 15° relative to the corresponding curves of FIGURE 12A and that the curves of FIGURE 12C are retarded 15° relative to the corresponding curves of FIGURE 12A.

With reference to FIGURE 12D, voltages V11, V3, and V7 are the same curves shown in FIGURE 12B, and VB11, VB3, and VB7 represent the booster voltages associated with V11, V3, and V7 for a retard angle of 45°.

$V11+VB11$, $V3+VB3$, and $V7+VB7$ are the combined main and booster transformer voltages.

$$\frac{V11+V12}{2},\ \frac{V3+V4}{2}$$

and $$\frac{V7+V8}{2}$$

are the average values of the pairs of voltages indicated.

With reference to FIGURE 12E curves V12, V4, and V8 are the same curves seen in FIGURE 12C; VB12, VB4, and VB8 represent the booster voltages associated with V12, V4, and V8 for a retard angle of 45°; and $V12+VB12$, $V4+VB4$, and $V8+VB8$ are the combined main and booster transformer voltages.

$$\frac{V11+V12}{2},\ \frac{V3+V4}{2}$$

and $$\frac{V7+V8}{2}$$

again are the average value of the indicated pairs of voltages.

It should be observed that FIGURES 12D and 12E represent two associated commutating groups of Y's 103 and 201. With zero transformer (and line) reactance, the diodes BD11 and BD12 in these two groups begin to conduct at substantially the same time resulting in voltages VB11 (FIGURE 12D) and VB12 (FIGURE 12E) (i.e., approximately 45° beyond the normal 30° commutation point of the primary voltage $e_{zx}$ which would be at the 75° point of $e_{zx}$).

Booster voltage VB3 and VB4, and VB7 and VB8 are provided in a similar manner. It will be observed in FIGURE 12D that when the voltage $V11+VB11$ decreases to the point that increasing voltage $$\frac{V3+V4}{2}$$

(indicated by the dotted line) is equal thereto, commutation occurs whereby the voltage of point N3 rises abruptly to V3. As shown in FIGURE 12E when the voltage $V12+VB12$ decreases to the point that increasing voltage $$\frac{V3+V4}{2}$$

(dotted curve) is equal thereto, commutation occurs whereby the voltage of point N4 drops abruptly to V4. Whereas the sum $V11+VB11+V12$ and $VB12$ are equal, V11 and V12 in general are unequal, and only equal at some definite point. A similar relation exists for V3, VB3 and V4, VB4; and for V7, VB7 and V8, VB8.

The above description of FIGURES 12D and 12E assumes that the potentials of points N1 and N2 are equal, and also that the potentials of points N3 and N4 are equal (as they are if the boosters are turned full on). However, with the boosters turned on during only a portion of the cycle of operation, slight modifications in the combined voltages appearing at these points when booster diodes are conducting will be necessary in order to insure that the time average of the voltage absorbed by the third commutating reactor will be zero. These modifications will take the form of variation in distribution of the voltage between the two booster transformers to automatically achieve the required equalization. The manner in which this occurs in time will be dependent upon the magnetizing current characteristics of the booster transformers and the commutating reactor. However, certain operating characteristics of the configuration of the present invention seem to increase the number of current steps.

Referring to FIGURES 12D and 12E which are drawn assuming zero transformer (and line) reactance, the commutation between $V11+VB11$ and V3, and between $V12+VB12$ and V4 are shown as taking place simultaneously. However, with appreciable transformer (and line) reactance, the fact that the first mentioned commutation takes place at a higher voltage, i.e., V3 higher than V4, should result in diode D3 beginning conduction slightly before D4 as indicated by the arrow pointing to the left in FIGURE 12D. Also, assuming zero transformer and line reactance, booster voltages VB3 and VB4 which are shown as beginning simultaneously would result in the simultaneous conduction of diodes BD3 and BD4. However, with appreciable transformer (and line) reactance, the greater voltage of VB4 compared to VB3 should cause diode BD4 to conduct before BD3. The other members of the commutation group shown in FIGURES 12D and 12E are operative in a similar manner.

Figure 11:
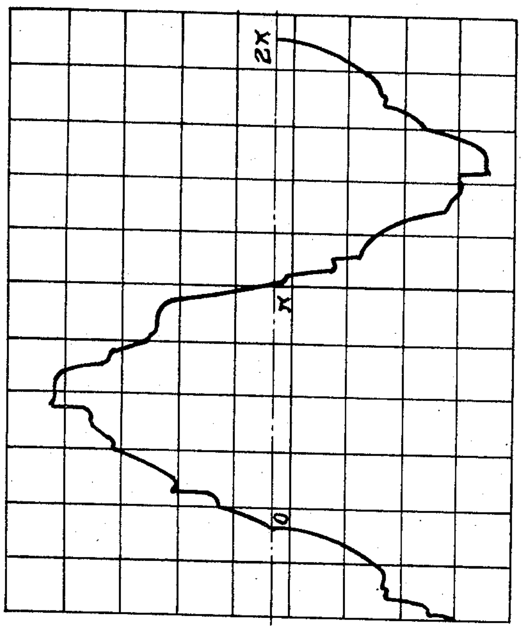
FIGURE 11 is an observed graph of the line current waveform of the twelve output phase rectifier of the invention SCR boost control with high filter choke inductance and a normal amount of transformer and line reactance.

Thus, current steps additional to those of FIGURES 9 and 10 as evidenced by observed result of FIGURE 11 should occur, making the line current $i_x$ of FIGURE 10 more closely approximate a sine wave with smaller higher harmonics. A similar description would apply to the commutating groups having neutral points N1 and N2.

*Derivation of necessary booster voltage*

Now by reference to FIGURES 12D and 12E, it can be seen that if boosters are turned full on, the point of commutation is at the 30° point of the primary voltage, and at the point of commutation the leading group (e.g. as represented by $V3+VB3$) requires no booster voltage but the trailing group (e.g. as represented by $V4+VB4$) takes all the booster voltage. Accordingly, this is the critical point as sufficient booster voltage must be provided to enable the trailing group to commutate at the same time as the leading group.

Figure 13:
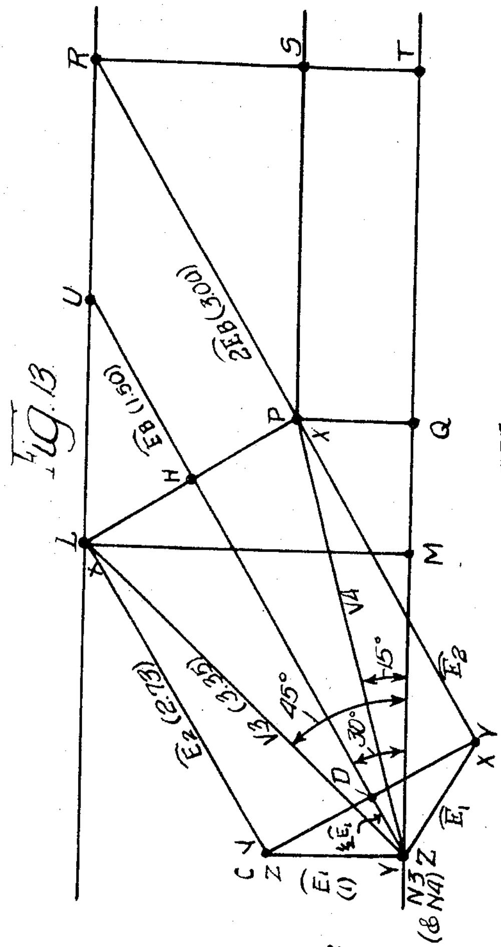
FIGURE 13 is a sketch illustrating the derivation of the necessary booster voltage and for illustrating the derivation of the average output voltage from two associated commutating groups.

Referring to FIGURE 13, therein are shown vectors V3 and V4 at the point of commutation. With boosters turned full on, points N3 and N4 will be at the same potential and hence are shown for convenience as the same point.

As shown in FIGURE 13, a boster voltage RS in addition to the voltage of point P will be needed to enable the V4 to commutate at the same time as V3. The derivation of the value of RS follows.

Let $\widehat{E_1}$ be the maximum voltage of YZ and ZX which is designated 1 secondary voltage unit as indicated hereinbefore. Let $\widehat{E_2}$ be the maximum voltage of YX which will be 2.73 secondary voltage units. Accordingly the maximum voltage of V3 and V4 individually will be 3.35 secondary voltage units.

Then $$LM=V3\sin 45°$$
$$PQ=V4\sin 15°$$
$$RS=LM-PQ=V3\sin 45°-V4\sin 15°$$

But $$V3=V4$$

Therefore $$RS=V3\ (\sin 45°-\sin 15°)=(3.35)(0.707-0.259)=1.50 \text{ voltage units.}$$

Now PR which represents the required value of the sum of the booster voltages ($2\widehat{E_B}$) is twice RS because ΔRPS is a 30–60 right triangle with <RPS=30°.

Therefore $PR=2RS=3.00$ secondary voltage units. It should also be observed that the line N3H represents the average of the voltage vectors V3 and V4 and generates the curve $$\frac{V3+V4}{2}$$

of FIGURES 12D and 13E; also, that the line HU represents the average of the maximum booster voltages in secondary windings T3 (5–6) and T4 (5–6) which would be the average of the maximum values of VB3 and VB4 of FIGURES 12D and 12E respectively. Of course, a higher booster voltage can be used.

Therefore, the line N3U would represent the average of the maximum values of the voltage outputs of the circuits passing current through diodes BD3 and BD4.

*Derivation of commutation point with boosters on*

A derivation of the point of commutation illustrated in FIGURES 12D and 13E (with a retard angle of 45°, for example) is now set forth.

Referring again to FIGURE 13, inasmuch as points N3 and N4 will be at the same potential with boosters fully on, N3 and N4 are indicated in FIGURE 13 as the same point. The lines YZ and ZX which are equal in length represent a maximum voltage value designated $\widehat{E_1}$. Triangle CDN3 is a 60° right angle triangle in which the line DN3 is equal to $\frac{1}{2}\widehat{E_1}$.

The lines YX which are equal in length represent a maximum voltage value designated $\widehat{E_2}$. Therefore, the line DH is equal to $\widehat{E_2}$, and line N3H which is equal to $\frac{1}{2}\widehat{E_1}+\widehat{E_2}$ is half the vector sum of the two voltages V3 and V4.

Let the line PR represent the maximum of the sum of the booster voltages of 5–6 windings of T3 and T4. Then half of this line represented by the line HU and designated $\widehat{E_B}$ will represent half the maximum of the sum of the booster voltages. Therefore, the line N3U will represent the average of the main transformer and booster transformer voltages at the same angle $\theta$. The average output voltage from the two zig-zags having vectors V3 and V4 and associated boosters of the two associated commutating groups 102, 200 can be expressed:

$$[(\tfrac{1}{2}\widehat{E_1}+\widehat{E_2})+\widehat{E_B}]\sin\theta$$

The average voltage of the next two zig-zags V7 and V8 not including associated booster will then be:

$$\left[\frac{1}{2}\widehat{E_1}+\widehat{E_2}\right]\sin\left(\theta-\frac{2\pi}{3}\right)$$

Letting $\theta_c$ represent the angle of commutation, commutation will thus occur when:

$$\left[\frac{1}{2}\widehat{E_1}+\widehat{E_2}\right]\sin\left(\theta_c-\frac{2\pi}{3}\right)=\left[\left(\frac{1}{2}\widehat{E_1}+\widehat{E_2}\right)+\widehat{E_B}\right]\sin\theta_c$$

$$\left[\frac{1}{2}\widehat{E_1}+\widehat{E_2}\right]-\left[\frac{1}{2}\sin\theta_c-\frac{\sqrt{3}}{2}\cos\theta_c\right]=\left[\left(\frac{1}{2}\widehat{E_1}+\widehat{E_2}\right)+\widehat{E_b}\right]\sin\theta_c$$

$$\left[\frac{3}{2}\left(\frac{1}{2}\widehat{E_1}+\widehat{E_2}\right)+\widehat{E_b}\right]\sin\theta_c=-\frac{\sqrt{3}}{2}\left(\frac{1}{2}\widehat{E_1}+\widehat{E_2}\right)\cos\theta_c$$

$$\tan\theta_c=-\frac{\sqrt{3}}{2}\frac{\left(\frac{1}{2}\widehat{E_1}+\widehat{E_2}\right)}{\frac{3}{2}\left(\frac{1}{2}\widehat{E_1}+\widehat{E_2}\right)+\widehat{E_b}}$$

or $$\tan\theta_c=-\frac{\sqrt{3}}{3+2\left(\frac{\widehat{E_b}}{\frac{1}{2}\widehat{E_1}+\widehat{E_2}}\right)}$$

Using the following theoretical values $\widehat{E_1}=17.0$ volts
$\widehat{E_2}=46.4$ volts
$\widehat{E_B}=33.1$ volts $$\tan\theta_c=-\frac{\sqrt{3}}{3+2\left(\frac{33.1}{54.9}\right)}=.41182$$

$\theta_c=157°37'$ which is 7°37′ beyond the point of normal commutation with booster transformers turned completely on.

If the boosters are turned on in the region from 0°–7°37′ later than the 30° point of the primary $e_{xy}$ voltage, commutation occurs from $V3+VB3$ directly to $V7+VB7$ and from $V4+VB4$ directly to $V8+VB8$ for example.

*Y delta, twelve phase, quadruple Y configuration*

In FIGURES 15 and 16 are shown a Y delta, twelve phase, quadruple Y configuration in which the invention is embodied. At the lower left of FIGURE 15, lines X, Y, and Z are incoming from a three phase alternating current source to the XY, XZ, and ZX windings of a first main transformer primary delta 100 and also to the X, Y, and Z terminals of a second main transformer Y 100W, Taps X1, Y1, and Z1 on the main transformer primary delta 100 provide connecting points to the booster transformer primary delta 101 whereby the voltages in the arms of the booster transformer primary delta are delayed 15° from the voltages in the corresponding arms of the primary delta 100 as illustrated by the dotted lines connecting points X1, Y1, and Z1. Such dotted line showing is for reference purposes only and the lines should not be construed as windings. The control circuits XY′–ZY′ for the controlled rectifiers SCR1–SCR6 in the primary booster delta 101 would provide control signals with a 15° delay as would be understood.

Main transformer secondary windings (FIGURE 16) XY, YZ, and ZX in he tvarious Y 102, 200, 103, 301 are magneticalyy coupled to windings XY, YZ, and ZX of the primary delta 100. Also secondary windings XN, YN, and ZN in the various Y are magnetically coupled to the windings of the primary Y 100 W.

By this arrangement, twelve vectors V1–V12 evenly spaced by 30 electrical degrees are established. The twelve booster secondary windings magnetically coupled to the six booster primary windings are connected to the twelve secondary windings of the main transformers as shown in FIGURE 16. This embodiment differs from the arrangement of FIGURES 1 and 2 in that each booster secondary winding such as T5 is connected in series with only one main transformer secondary winding such as YZ in Y 102. Diodes D1–D12 and BD1–BD12 are connected to the main transformer and booster transformer secondary windings and are operative in a manner which will be understood from the earlier description. Reactors 104, 202 and 203 are connected to the neutral points N1–N4 in the manner of the structure of FIGURES 1 and 2. With this arrangement the vector V1–V12, as shown, would be spaced instantaneously as follows:

V1—150°
V2—120°
V3—90°
V4—60°
V5—30°
V6—0°
V7—330°
V8—300°
V9—270°
V10—240°
V11—210°
V12—180°

By way of example, when the control circuit XY′ causes SCR6 to conduct, current flows in primary booster windings T5 (2–1) and T6 (2–1), in turn inducing voltages in secondary booster windings T5 (3–4) and T6 (3–4) having a phase position mid-way between that of vectors V1′ and V2′, whereby diodes BD1 and BR2 are 3 caused to begin conduction substantially at the same time. The operation of the other booster transformer windings in providing voltage midway between the other pairs of secondary vectors would be understood therefrom.

The operation of the reactors and operation of the system in regulating the voltage across the load will be understood from the previous description.

Another alternative method of shifting booster secondary voltages consists of connecting the incoming three phase lines X, Y, and Z without phase shift to the booster primary delta 101 and providing a 15° phase shift between the incoming three phase lines and the main transformer primary delta.

It is understood that the above unit shown in FIGURES 1, 2, 15 and 16 in which the booster transformer has primaries connected in series and which are supplied through suitable switching devices from a voltage source having a phase position intermediate between successive phases in the output of the transformer secondary circuit could be applied to other booster transformer configurations than the one illustrated. For example, a twelve-pulse booster arrangement could be applied to a twenty-four pulse main rectifier in a maner similar to that herein described.

Booster transformers $T_1$ and $T_2$ could be combined into a single unit having but one primary by using magnetic coupling in place of the series primary connection shown. Such arrangement is illustrated in FIGURE 17. The four secondaries are designated by $T_1$ and $T_2$ to indicate the manner in which they would be connected into the rectifier circuit. The inverse connected SCRs would be connected in series with the single primary winding.

By using a shell-type three-phase construction, transformers $T_1$, $T_3$ and $T_5$ could be incorporated into a single unit while the same could be done with transformers $T_2$, $T_4$ and $T_6$. If desired, using a shell-type three-phase construction with the winding arrangement shown in FIGURE 17, transformers $T_1$, $T_2$, $T_3$, $T_4$, $T_5$ and $T_6$ could be incorporated into a single unit as shown in FIGURE 18.

*Description of FIGURE 14*

With reference to FIGURE 14, the telephone influence versus load and line changes for six phase and twelve phase 48 volt 1600 ampere charges is shown therein. In this graph, the ordinate is $I \cdot T$ product, and the abscissa is direct current ampere output.

The upper three curves relate to the six phase design of a known commercial product of good quality, the lower three curves to the twelve phase design of the present invention tested under the same conditions. The upper, middle, and lower curves of each set are related to input line voltages of 452.8 alternating current volt (RMS), 416.4 alternating current volts (RMS) and 380 alternating current volts (RMS) respectively.

From these curves it can be seen that approximately a 44% reduction in $I \cdot T$ product is effected by the twelve phase design of the invention over the six phase design tested.

While what is described is regarded to be a preferred embodiment of the invention, it will be apparent that variations, rearrangement, modifications and change may be made therein without departing from the scope of the present invention as defined by the appended claims.

*Definitions*

The following terms used in expressing the influence battery chargers or power supplies have upon telephone circuits are defined as follows:

TIF (telephone influence factor)—the ratio of the square root of the sum of the squares of "weighted" RMS values of all the sine wave components to the RMS value of the wave. This refers to either voltage TIF or current TIF.

$I \cdot T$ product—the product of the RMS value of the current and the current TIF defined above and designated T in this formula. Consequently this becomes the square root of the sum of the squares of "weighted" RMS values of all the sine wave current components.

What is claimed is:

1. A circuit for supplying current from a three-phase alternating current source to a direct current load comprising a main transformer having primary and secondary windings, means connecting the primary windings of said main transformer in delta configuration to said source, means connecting the secondary windings of said main transformer in zigzag configuration to provide a plurality of equally spaced consecutive voltage vectors, means including first rectifier means connecting each zigzag to said load, booster transformer means having a plurality of series connected primary windings for each phase and at least twice as many secondary windings, means connecting the primary windings of said booster transformer means in a primary delta configuration in parallel with said primary delta configuration of said main transformer means, means connecting at least one of the secondary windings of said booster transformer means for one primary phase in series with one of said main transformer zigzags and phase displaced with the vector provided by said zigzag, and a second one of the secondary windings for said same phase in series with the zigzag which produces the next consecutive voltage vector, said secondary booster windings operating with half the number of phases as the main transformer secondary windings, and second rectifier means connecting said one secondary booster winding to said load.

2. A circuit as set forth in claim 1 in which said second rectifier means are connected to cut off said first rectifier means in said one zig-zag with enablement of said second rectifier means.

3. A circuit for supplying current from a three-phase alternating current source to a direct current load comprising a main transformer having primary and secondary windings with said main transformer primary windings connected in delta configuration to said source, reactor means connecting said secondary windings in zigzag configuration to provide a plurality of equally spaced consecutive voltage vectors, first rectifier means connecting each zigzag to said load circuit, booster transformer means comprising a plurality of primary windings for each phase and a plurality of secondary windings for each primary winding, means connecting said booster primary windings in a booster primary delta configuration in parallel with the primary delta of said main transformer, each arm of the booster delta comprising two controlled rectifiers in inverse parallel relation for connecting two booster primary windings in series, each of said booster primary windings being inductively coupled with a different pair of booster secondary windings, means connecting one booster secondary winding of a pair in series with one of the zigzags which produce one voltage vector, means connecting a booster secondary winding of the other pair in series with the zigzag which produces the next consecutive voltage vector, second rectifier means connecting each booster winding and its series connected zigzag to said load circuit, and control means for providing phase angle control firing of said controlled rectifiers to maintain the load voltage essentially constant.

4. A circuit for supplying current from a three phase alternating current source to a direct curent load comprising main transformer means having secondary winding means, means connecting said secondary winding means to provide twelve alternating voltages of equal amplitude and equally spaced in phase by thirty electrical degrees, said secondary winding means being so interconnected as to provide first, second third and fourth Y connected commutating groups, said numbering being in the order of increasing phase displacement, a first reactor means, the neutral points of said first and third Y groups being connected to end terminals of said first reactor means, a second reactor means, the neutral points of said second and fourth Y groups being connected to the end terminals of said second reactor means, a third reactor means, means connecting the center taps on said first and second reactors to the end terminals of said third reactor means, means connecting the center tap of said third reactor means to said load, booster transformer means comprising a plurality of primary windings connected in booster primary delta configuration, each of the three arms of the booster delta comprising a series connection of two booster transformer primary windings and two parallel connected and oppositely poled controlled rectifiers, means coupling each booster primary winding to at least two booster secondary windings, each of which booster secondary windings is connected to at least one main transformer secondary winding, at least a first and second one of said booster secondaries coupled to a first and second primary winding in the same primary delta arm being respectively connected to first and second ones of said main transformer secondary winding means whose resultant voltages are thirty degrees apart whereby the phase of the sum of the booster secondary voltages lies midway therebetween.

5. A circuit as set forth in claim 4 in which said first, second, third and fourth Y's comprise four autonomous commutating groups with three zig-zags in each group, and in which each zig-zap defines a resultant voltage, the corresponding resultant voltages of said first and second groups having a relative phase displacement of thirty electrical degrees, said third and fourth groups having a relative phase displacement also of thirty electrical degrees, said first and third groups having a relative phase displacement of sixty electrical degrees, said second and fourth groups having a relative phase displacement of sixty electrical degrees, said means connecting said booster secondary windings to said zig-zags such that each pair of booster secondary windings coupled to the same booster primary winding is connected in groups interconnected by the same reactor of said first and second reactors.

6. A circuit for supplying current from a polyphase alternating current source to a direct current load comprising at least a main transformer having primary and secondary windings, means connecting the primary windings of said main transformer to said source, means connecting the secondary windings of said main transformer to provide a plurality of equally spaced consecutive voltage vectors, booster transformer means having a plurality of primary and secondary windings, means connecting the primary windings of a plurality of said booster transformer means in series in each phase of said source, means connecting at least one secondary winding of one of said booster transformer means for a primary phase in series with said secondary winding means of said main transformer which provide one of said vectors and one of said booster secondary windings for a different primary winding in said phase in series with the main transformer secondary winding which produces a consecutive one of said voltage vectors whereby the sum of the booster voltages for a phase are electrically spaced between said one and said consecutive one of said vector voltages.

7. A circuit as set forth in claim 6 in which each combination of secondary windings comprised of a booster and main secondary winding includes switching means for at times connecting the main secondary winding to said load independent of the booster secondary winding, and at other times connecting said booster secondary and said main secondary winding additively to said load.

8. A circuit as set forth in claim 6 in which said means for connecting said main transformer to said source includes means for connecting at least certain of the primary windings in delta configuration.

9. A circuit as set forth in claim 6 in which said means for connecting said secondary windings of said main transformer to said load includes means for connecting said secondary windings in quadruple Y configuration.

10. A circuit as set forth in claim 6 which includes control means for selectively varying the conduction interval of current in the primary windings of said booster transformer means,

11. A circuit as set forth in claim 6 in which said means for connecting said secondary windings of said main transformer to said load includes means for connecting said secondary windings in a quadruple Y configuration, and a first reactor means connected between the neutral points of a first and second Y, a second reactor means connected between the neutral points of a third and fourth Y, and a third reactor means connecting the output voltage of said first and second reactor means to said load.

12. A circuit as set forth in claim 6 in which said means connecting the primary windings of said main and booster transformers to said source include means for shifting the voltages in said primary windings of the booster and main transformer means a predetermined number of electrical degrees relative to each other.

13. A circuit for supplying current from a three-phase alternating current source to a direct current load comprising a main transformer having primary and secondary windings, means connecting the primary windings of said main transformer to said source, means connecting the secondary windings of said main transformer in quadruple Y configuration, means including a first reactor means for interconnecting a first and a second one of said Y's, and a second reactor for interconnecting a third and a fourth ones of said Y's, booster transformer means having a plurality of pairs of primary windings and at least a pair of booster secondary windings for each booster winding means, means connecting the different pairs of primary windings of said booster transformer means in different arms of the primary configuration, means connecting the secondary windings of said booster transformer means with said main transformer secondary windings, the secondary windings of a pair for a first booster transformer being connected with a diametrically opposed main transformer secondary winding in a different Y, both of which Y's are interconnected by the first reactor means, and a further pair of secondary windings for the booster transformer means having a primary winding connected in the same arm with said first booster transformer being respectively connected to diametrically opposed transformers in the other two Y's which are connected to said second reactor means.

14. A circuit for supplying current from a three-phase alternating current source to a direct current load comprising a main transformer having a plurality of primary windings at least certain of which are connected in delta configuration to said source and a plurality of secondary windings, means connecting said secondary windings in Y configuration to produce a plurality of equally spaced voltage vectors, booster transformer means connected in a delta configuration comprising a plurality of primary windings series connected in each arm of said delta configuration, means connecting said booster primary windings to said source with a shift of a predetermined number of electrical degrees relative to the windings of said main transformer, each of said booster primary windings being inductively coupled with at least a pair of secondary booster windings, means connecting one winding of a pair of secondary booster windings in one Y which produces one vector, means connecting the other secondary winding of said pair to a Y which provides a different vector, the booster voltages provided by each winding of said pair being displaced from the vector provided by its associated Y, and means connecting the output of said Y's to said load.

References Cited

UNITED STATES PATENTS

| | | | |
|---|---|---|---|
| 2,502,729 | 4/1950 | Klinkhamer | 321—8 X |
| 3,270,270 | 8/1966 | Yenisey | 321—24 |
| 3,335,356 | 8/1967 | Rhyne | 321—20 |
| 1,872,253 | 8/1932 | Davis | 321—5 |
| 1,895,370 | 1/1933 | Boyajian | 321—5 |
| 2,166,900 | 7/1939 | Bohn et al. | 321—9 |
| 3,351,838 | 11/1967 | Hunter | 321—5 |

FOREIGN PATENTS

| | | |
|---|---|---|
| 129,726 | 7/1959 | U.S.S.R. |
| 505,301 | 5/1939 | Great Britain. |
| 718,594 | 11/1954 | Great Britain. |

OTHER REFERENCES

AIEE Technical Paper 43–26, "Harmonics and Load Balance of Multiphase Rectifiers, Considerations in the Selection of the Number of Rectifier Phases." R. D. Evans, December 1942, pp. 1–11.

JOHN F. COUCH, *Primary Examiner.*

W. H. BEHA, Jr., *Assistant Examiner.*

U.S. Cl. X.R.

321—9, 20, 26, 57; 320—39